2,833,782

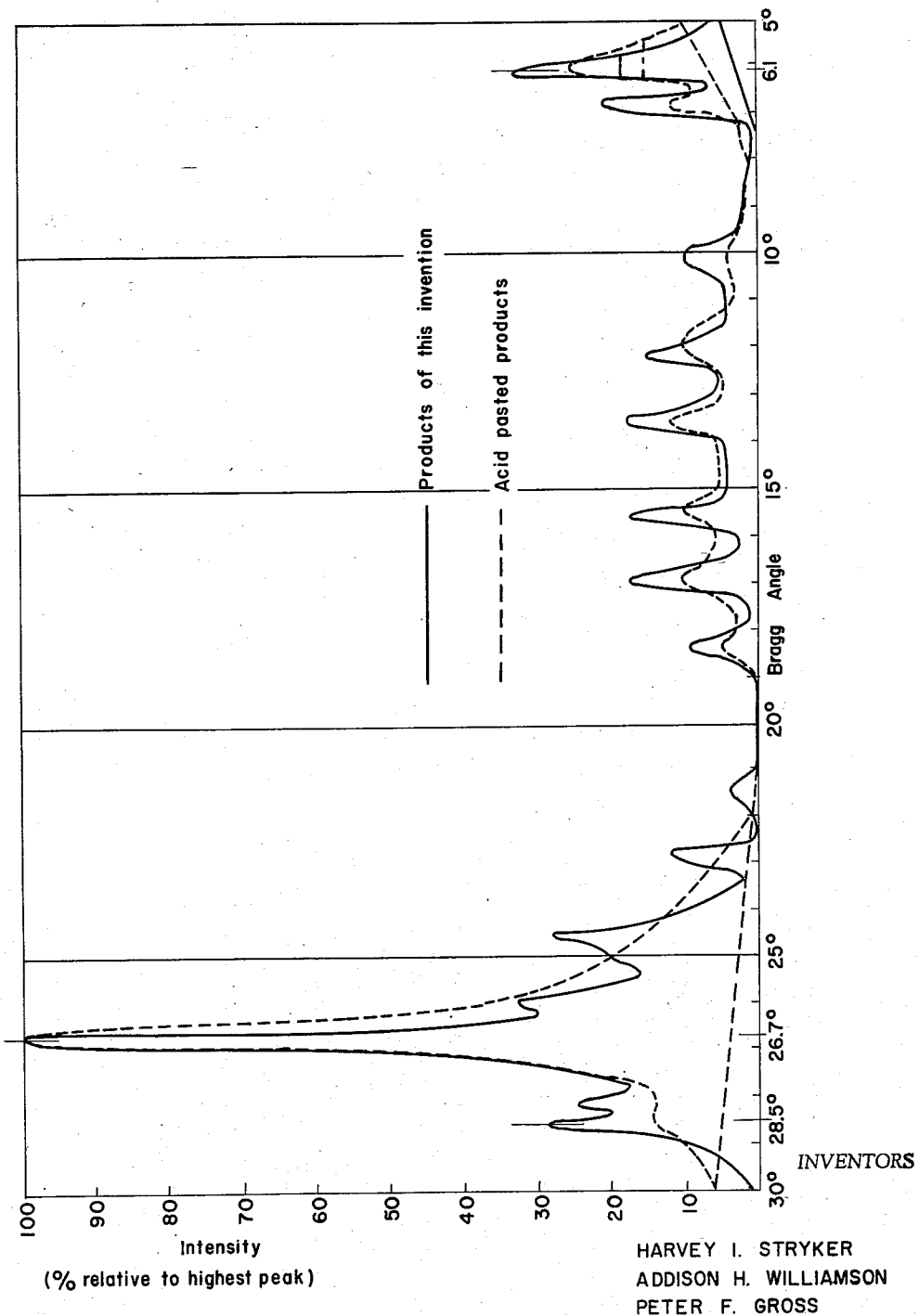

Patented May 6, 1958

2,833,782

TREATMENT OF POLYCHLORO COPPER PHTHALOCYANINE

Harvey I. Stryker, Carney's Point, N. J., Addison H. Williamson, Louisville, Ky., and Peter F. Gross, Woodstown, N. J., assignors to E. I. du Pont de Nemours & Company, Wilmington, Del., a corporation of Delaware Application April 12, 1954, Serial No. 422,492

15 Claims. (Cl. 260—314.5)

This invention relates to a process for the treatment of crude polychloro copper phthalocyanine whereby to obtain the color in a finely divided physical form having good pigmentary properties such as tinctorial strength, softness and freedom from grit.

Polychloro copper phthalocyanine in practice generally refers to copper phthalocyanine which has been chlorinated to very near its maximum theoretical chlorine content. The maximum theoretical content is 16 Cl atoms per molecule, or a chlorine analysis of 50.5% by weight. This ideal, however, is seldom realized in practice, and the methods customarily employed in commercial manufacture generally introduce from about 13.5 to about 15.5 atoms of chlorine (on the average) per molecule. Accordingly, in this application, the term polychloro copper phthalocyanine shall be understood as referring to a color having a chlorine analysis of not less than 46.0%, which corresponds to 13.5 Cl atoms per molecule.

Several methods have been developed in the art for chlorinating copper phthalocyanine to the high stage above referred to. One of these reacts chlorine with copper phthalocyanine while the latter is dissolved in a melt of a suitable inorganic flux, for instance a low-melting mixture of aluminum chloride and sodium chloride (U. S. P. 2,247,752). The ratio of these is generally in the vicinity of the eutectic ratio, that is 4:1 by weight, in the order named; therefore, this process using an aluminum-chloride-sodium-chloride melt will hereinafter be spoken of as the eutectic process, and the pigment obtained therefrom will be referred to as eutectic crude.

This invention is concerned primarily with polychloro copper phthalocyanine as obtained in this so-called eutectic process. It is applicable, however, also to crudes obtained by other processes wherein the color comes in contact with substantial quantities of aluminum chloride during or after chlorination. The invention has for its primary object a method of treatment of the crude reaction mass whereby to obtain the color directly in a pigmentary form. By this we mean that the color is obtained in the form of an aqueous paste or a soft, dry powder which is adapted directly for incorporation into liquid organic vehicles to produce paints, varnishes or printing inks. Another object of this invention is to achieve the aforegoing pigmentary state with maximum economy and without resort to any treatments with concentrated sulfuric acid, chlorosulfonic acid, or other strong acids. Various additional objects and achievements of this invention will become apparent as the description proceeds.

In the mentioned eutectic process for the commercial production of polychloro copper phthalocyanine, the crude color, after drowning in water, filtering, washing and drying, is obtained in the form of fine particles which, however, lack in tinctorial strength. To be suitable for incorporation into paints, varnishes and inks, the color must have a so-called pigmentary form or texture. This implies fine particles, which disperse readily in oil, which are free of grit, and which develop maximum tinctorial strength, when incorporated into an ink- or paint-vehicle, with a minimum of mechanical working. (The latter property is generally referred to as "softness.")

In the case of many pigments, especially copper phthalocyanine and metal-free phthalocyanine a prevalent method for converting the crude color into pigmentary form has been the so-called acid-pasting method. This term implies dissolving the color in concentrated sulfuric acid and then drowning the solution in water, whereby the color precipitates in very fine, crystalline form and is filtered off. Numerous modifications of and improvements upon the acid-pasting process have been suggested in the art and are recorded in the patent literature.

Polychloro copper phthalocyanine, however, is barely soluble in concentrated sulfuric acid, and enormous quantities of the acid would be required to effect solution of a given batch from commercial operation. Consequently, the acid-pasting method per se is impractical for the treatment of the polychloro crudes. To overcome this difficulty, a modified method has been suggested, whereby chlorosulfonic acid is added to the concentrated sulfuric acid, to increase the solubility of the polychloro compound. But the process is still not very economical, because of the relatively high cost of chlorosulfonic acid.

Among other methods recently suggested for the phthalocyanines in general, and especially for unchlorinated copper phthalocyanine, are the so-called acid-slurry processes. In the basic process of this type, sulfuric acid of lower concentration is employed, so that it is incapable of dissolving the color, but has some sort of "swelling action" thereon, most probably through conversion of the pigment into a sulfate (British 503,666 and FIAT report 1313, vol. III, pages 298–303). An improved modification of this basic process which makes it applicable to polychloro copper phthalocyanine is set forth in the copending application of George Barnhart, Serial No. 278,969 (Patent No. 2,765,319, issued October 2, 1956), wherein the acid-slurrying is achieved by using sulfuric acid of 98–99% strength, but in conjunction with sodium sulfate which apparently forms some inorganic complex compound with the acid and promotes the desired "permutoid swelling" of the color. Nevertheless, the process still revolves about the use of concentrated sulfuric acid. Methods involving mechanical work have also been suggested, for instance salt-milling (U. S. P. 2,402,167), solvent-milling (U. S. P. 2,556,726–7) and salt-solvent milling (U. S. P. 2,556,728).

Now according to this invention, a generally applicable, practical, economical and uniformly reliable method has been developed for converting crude polychloro-copper phthalocyanine into pigmentary state. For the sake of simplifying the presentation, the discussion hereinbelow will be limited at first to the crude polychloro product obtained in the eutectic process.

In its principal features our novel method comprises treating the reaction mass, directly as obtained in the eutectic process, with water and an organic liquid in such a manner as to effect simultaneously or in sequence, in either order, the following two achievements: (1) Separation of the inorganic constituents of the reaction mass by dissolving them in water; (2) coating the pigment particles, completely or partially, with an organic liquid. Following these two principal achievements, the mass on hand may be treated in any convenient manner to obtain it in any desired commercial form. For instance, the mass may be filtered to eliminate excess water, and then handled in commerce as a paste containing both water and organic solvent. Or the filtered mass may be steam distilled, filtered off and washed to give a purely aqueous paste. Or again, the mass may be steam distilled, filtered off, washed and dried to give a dry product. Various modifications or combinations of these methods or other elaborated modes of isolation may also be applied.

The mentioned two-fold treatment may be achieved for instance by drowning the fused reaction mass in water containing the desired organic liquid, followed by filtration. Or it may be achieved by drowning the crude melt in water, and then adding an organic liquid. Or again, the organic liquid may be entered into the molten eutectic mass prior to drowning in water.

The organic liquid contemplated for use in our invention is one which is immiscible with water and which will normally displace water from the surface of a solid phthalocyanine pigment particle. In other words, the organic liquid is one which is adapted for "flushing" a phthalocyanine pigment, for instance copper phthalocyanine, out of an aqueous mass thereof. As illustrations of effective liquids may be mentioned toluene, xylene, p-chlorotoluene, o-dichlorobenzene, trichlorobenzene, nitrobenzene, o-nitrotoluene, mineral spirits, trichloroethylene, tetrachloroethylene, cetane, pine oil, benzonitrile, dimethyl aniline, quinoline and n-amyl acetate. Where it is decided to add the organic liquid to the molten eutectic mass prior to drowning, it is obviously desirable to choose a liquid which boils above the temperature of the molten mass. It is also desirable that the liquid be volatile with steam, so as to be capable of removal by steam distillation, if desired.

The quantity of water should of course be sufficient to dissolve the inorganic constituents of the reaction mass, but will normally be several times this quantity. The quantity of organic liquid should be sufficient to effect flushing of the pigment particles, without forming a continuous organic phase. This point is discussed in further detail hereinbelow.

Taking up now our mode of procedure in greater detail, our copending application Serial No. 350,502 describes a procedure comprising three or four separate steps:

(1) Separation of the pigment from the inorganic salts present in the reaction mass.

(2) Transfer of the pigment from an aqueous phase into an organic liquid phase.

(3) Removal of the organic liquid phase, and—

(4) (As an optional step)—production of an aqueous press cake, which is suitable either for direct use by the paint or printing ink manufacturers or for drying to produce a soft powder.

According to the further description in said copending application, the first step is achieved by drowning the eutectic reaction mass in water which contains or to which is subsequently added an organic liquid such as o-dichlorobenzene in quantity corresponding to from 0.4 to 1.1 parts by weight per part of polychloro copper phthalocyanine present in the reaction mass. The mass is stirred at moderate temperature (25° to 40° C., and in any event not above 80° C.), and the undissolved color is filtered off and washed with water. Operating in this manner the inorganic salts are more effectively removed in the washing operation. When an organic liquid is not employed in the drowned mass, it is virtually impossible to remove the inorganic salts completely by ordinary washing of the filter cake with water, no matter how prolonged the washing.

In the next step of our earlier procedure, the washed pigment from step 1 is heated in a relatively large quantity of a water-immiscible, neutral, organic liquid which can be readily removed by steam distillation. Suitable illustrations for this purpose are the benzenoid hydrocarbons and their nuclear halogen and nitro derivatives, for instance benzene, toluene, xylene, monochlorobenzene, o-dichlorobenzene, trichlorobenzene, nitrobenzene, o-nitrotoluene and p-chlorotoluene. Conveniently, the liquid chosen here will be the same as that used in step 1; but there is no absolute necessity for such identity. The quantity of organic liquid this time is much higher than in the first step, and is of the order of 5.5 to 9 parts by weight for each estimated part of pigment in the filter cake; in other words, the organic liquid is taken in quantity sufficient to produce with the pigment a free-flowing slurry, but avoiding excessive quantities which would needlessly increase the cost of the process. The suspended mass is heated, with good agitation, at a temperature between 102° C. and 170° C. for a period of time sufficient to insure evaporation of all moisture from the mass. In the case of organic liquids which boil below 100° C., the temperature of heating may be as low as the boiling point of the liquid in question.

In the third step of said procedure, the excess organic liquid from the second step is removed either by filtering off, followed by washing of the pigment with a volatile, water-miscible organic solvent, for instance alcohol, or by steam distillation. The end product is customarily obtained in the form of an aqueous paste, suitable directly for handling in commerce or in paint or ink manufacture. But it may also be dried to give a soft powder of pigmentary qualities.

Now, while the above detailed procedure is still considered good and gives a product of highest pigmentary qualities, we now find nevertheless that our invention is not restricted to such meticulous detail of procedure, and that a product of excellent physical qualities may also be obtained by omitting or consolidating some of the above steps of procedure, thereby increasing the economy of the entire process.

According to our further development of this invention, we find that we may omit steps 2 and 3 altogether. Thus the filtered and washed product from the first step may be handled in commerce or paint manufacture as an aqueous paste of pigment having some organic solvent therein, and characterized by superior pigmentary qualities compared to material produced by acid pasting, as more fully discussed below.

We may, however, also suspend the filtered and washed product of step 1 in a fresh quantity of water, and then proceed to steam distil off the solvent as in step 3 above. The resulting aqueous paste may be used as such or it may be dried. Or again, the filtering and washing operations may be carried out after steam distillation. In such cases, the excess aqueous phase may be decanted off, whereupon alkali is added to neutralize the acidity of the residual paste, and steam distillation is applied followed eventually by filtering off the pigment and washing.

We also find that our novel process is not limited to the use of polychloro copper phthalocyanine crudes obtained in the eutectic process but may also be applied to other products wherein the polychloro product is produced in the presence of substantial quantities of aluminum chloride, say 2 or more moles of $AlCl_3$ per mole of initial pigment. Such a process, for instance, is the modified sulfur-dichloride process of chlorination described and claimed in copending application of F. F. Ehrich Serial No. 422,674, of even date herewith.

Finally, we find that the required contact above mentioned is not limited to aluminum chloride, but may be achieved also with aluminum bromide and ferric chloride, all of which come under the general formula $MX_3$, wherein X stands for chlorine or bromine, while M designates the metals Al and Fe.

The quantities of organic liquid employed in the various steps may also be varied considerably from the teachings in our said prior application.

In those processes which involve drowning in water, followed by filtration, it is desired to displace completely the water or aqueous salt solution from the surface of the pigment particles without forming a suspension of the pigment in organic liquid. This limits, for practical purposes, the quantity of organic liquid to be used to about 1.1 parts of liquid per part of pigment. As for the lower limit, the exact quantity required will vary with the nature of the liquid. 0.30 part by weight of the organic liquid per part of pigment has been found to give good results in the case of many liquids (e. g. xylene); however, to insure uniformly good results in all cases we recommend, as a thumb rule, a minimum of 0.40 part of the organic liquid per part of pigment.

In processes which do not involve filtration prior to removal of the organic liquid, for instance where treatment with organic liquid is followed directly by alkalization and steam distillation, there is no upper limit to the quantity of organic liquid useable, except of course the practical consideration of cost.

In all the treatments above, our product is obtained in a novel physical form which differs in crystal habit from polychloro copper phthalocyanine obtained by the hitherto known methods. The unique crystal habit of our product can be distinguished from other polychloro copper phthalocyanines by certain physical measurements described below.

We find all the products treated according to this invention to be distinctly more yellow in their green shade than samples of the same polychloro material which have undergone acid-pasting. Our products are frequently also of jetter masstone than the acid pasted material, and at least equal to it in brilliance (sometimes referred to as intensity).

Electron micrographs show our novel product to consist of uniform crystals of parallelepiped shape, of a length which is from 2 to 3 times the width and from 5 to 10 times the thickness. The length itself is in the range of 0.05 to 0.2 micron.

Another means of defining the physical properties of our novel product is by its X-ray diffraction pattern. The use of this technique to characterize crystal phases is well known, and the various phases may be recognized by the presence or absence of characteristic interplanar spacings within the crystal as exemplified by the peaks in the X-ray diffraction record. However, it is also recognized that variations in crystals not involving changes in crystal phase may influence the relative intensity of the X-ray diffraction peaks and we have selected the relative intensities of two prominent peaks as one of the distinguishing characteristics of the new product.

It is an accepted rule in the study of X-ray diffraction patterns of very small crystals that the width of the diffraction peaks is a measure of crystal size with the broader peaks accompanying the smaller crystal sizes. It has been observed that the products of this invention exhibit characteristically narrow X-ray diffraction peaks and we have selected the width of one prominent peak as another characteristic of these products.

For a better understanding of the discussion on this topic, reference is made to the accompanying drawing, wherein the sole figure represents two typical X-ray patterns obtained in the study of our novel products.

The solid curve represents the products of this invention; the dotted curve represents the products obtained from the same crude polychloro materials but refined through the old, acid-pasting procedure. Both are idealized curves in the sense that in transcribing them from the original pattern recorded by the Geiger-counter apparatus, the extremely wriggly oscillations superimposed upon the principal curve by the random background "noise" have been ignored.

The patterns shown in the drawing were obtained through the well-known powder technique using a North American Philips X-ray diffractometer. The radiation was that known as copper K$\alpha$. The X-ray tube was run at 35,000 volts and 18 milliamperes. The slit system used 1° divergence slits and a 0.003 inch receiving slit at a distance of 170 mm. from the specimen. The intensity of the diffracted beam was recorded by means of a Geiger counter and plotted against the Bragg angle (2$\theta$).

In all X-ray diffraction patterns of polychloro copper phthalocyanine, there is a peak of maximum intensity at a Bragg angle of approximately 26.7°. For purposes of defining the new product, the intensity of the peak at Bragg angle 28.5° is measured relative to the intensity of said maximum peak, and the peak at Bragg angle 6.1° is measured for width as an index to average crystal size.

It is our unexpected discovery that all polychloro copper phthalocyanine products which have been chlorinated in the presence of aluminum chloride, or treated with relatively large amounts of a metal halide of form $MX_3$ as above defined, yield X-ray patterns under the conditions described, in which the intensity of the peak at Bragg angle 28.5° is less than 40% of that at 26.7°. When these products are finished by the prior art method of acid pasting or similar methods in which particle size reduction is brought about through chemical changes and regeneration, the intensity of this peak approaches and sometimes reaches zero. On the other hand, in the case of the new products of this invention, the intensity of this peak at 28.5° is found to fall in the narrow range of 18% to 40°% of that of the peak at 26.7°. In estimating this degree of intensity, the measurement is made from a base line which excludes the background scattering of the X-ray beam and, in this case, is drawn between the two points on the curve which correspond to Bragg angles 30° and 21°, these representing low points on the curve of each side of the maximum peak.

It is also accepted that the width of an X-ray diffraction peak at its half-maximum intensity is a function of the crystallite size. Using the peak at 6.1° under the conditions described above, the highly crystalline products of this invention give patterns in which the horizontal width at half-maximum intensity, measured from the base line drawn between the two points on the curve corresponding to Bragg angles 7.3° and 5°, is less than 0.5° (on the Bragg angle scale). All prior-art, acid-pasted products show a peak width under these conditions in the order of 0.7° to 0.9°. A few highly crystalline products have been observed with peak widths of about 0.3° which were made by processes not using large amounts of $AlCl_3$ in the chlorination but they show an intensity in the 28.5° peak markedly exceeding 40%.

To summarize, a detailed procedure for characterizing the new product by X-ray diffraction is as follows:

(1) Obtain an X-ray diffraction pattern, plotting intensity against Bragg angle.

(2) Draw a base line through the two points on the curve corresponding to Bragg angles of 30° and 21°, and again between the two points corresponding to Bragg angles 7.3° to 5.0°.

(3) Determined peak intensities by measuring peak height from the base-line at 26.7°, 28.5° and 6.1°. Express the peak intensities relative to the intensity at 26.7°, calling the latter 100%.

(4) Measure the horizontal width of the band at the half-maximum intensity for the peak at 6.1°.

Returning now to the details of our process, the same may be modified in various ways as long as it contains the essential treatments hereinabove set forth. For instance, during the steam distillation step, where such step is employed, certain reagents may be added to effect additional improvements in the quality of the product. Thus, maintaining the mass on the alkaline side (pH>7) has been found to give products of highest tinctorial strength. Addition of minor quantities (say about 2% based on weight of pigment) of oxidizing agents, for instance sodium chromate or sodium nitrite, exerts a beneficial effect upon the brilliance of the color. Addition of minor quantities (about 2%) of fatty compounds such as natural fats, long-chain fatty acids, soaps or esters, or long-chain fatty alcohols or their esters (acetates, propionates, etc.) contributes toward the production of soft powders.

In the other steps, too, certain modifications of procedure are permissible. Thus, while drowning the crude chlorination mass directly in water containing the organic liquid (or to which the organic liquid is subsequently added) obviously entails the minimum labor of handling materials, it is nevertheless entirely permissible to start with a pigment which has already been separated from the bulk of inorganic salts as by drowning in pure water or in water containing less than the desired minimum of organic liquid, followed by filtering and perhaps also some degree of washing.

Also, instead of filtration and washing in the drowning step, the pigment may also be separated from the bulk of the aqueous mass by repeated decantations, by continuous filtration, or by other convenient physical processes.

The steam distillation step, where used, may be achieved in any convenient apparatus. We find, however, that removal of the organic phase may be achieved most efficiently and economically by using an apparatus adapted for turbannular flow and passing in the steam at a velocity adapted to produce the turbannular state (see for instance, Morrow and Parsons, U. S. P. 2,467,769, or Roberts, Gage and Brautcheck, U. S. P. 2,528,320).

Without limiting our invention, the following examples are given to illustrate our preferred mode of operation. Parts mentioned are by weight.

EXAMPLE 1

Step 1.—350 parts of a melt obtained by chlorinating 53 parts of copper phthalocyanine in an anhydrous aluminum chloride-sodium chloride melt according to U. S. P. 2,247,752 until 49 parts of chlorine have been absorbed were drowned in 1600 parts of cold water. The temperature having risen to 78° C., 450 parts of ice were fed in to cool the mass to about 35°–40° C. 65 parts of o-dichlorobenzene were then stirred in during 10–15 minutes. The o-dichlorobenzene was completely adsorbed onto the particles of the pigment, so that no oily phase separated.

The slurry was filtered and the cake was washed with water until free from acid and from water-soluble chlorides.

Step 2.—The filter cake was added to 650 parts of o-dichlorobenzene and agitated to form a smooth slurry. This was heated to 100°–102° C. and held until the water originally present in the filter cake was boiled off, along with a fraction of the o-dichlorobenzene. The temperature of the dewatered slurry was then raised to 130°–135° C. and held for 1.5 hours.

Step 3.—The slurry was cooled to below 90° C. and 8 parts of sodium hydroxide were added as a concentrated aqueous solution. Live steam was introduced into the bottom of the slurry and the o-dichlorobenzene was steam distilled off until the distillate coming over contained no appreciable amount of o-dichlorobenzene. The slurry was then filtered and the cake was washed with water until free from alkali.

When a portion of the filter cake was flushed into lithographic varnish it was found to be yellower, stronger, and jetter in masstone than polychloro copper phthalocyanine press cake prepared by acid pasting in a mixture of sulfuric and chlorosulfonic acids.

When a portion of the filter cake was dried, pulverized, and ground into lithographic varnish, it was found to be yellower, brighter, of equal tinctorial strength and jetter in masstone compared to polychloro copper phthalocyanine powder prepared by acid pasting.

The procedure of this example was repeated, except that a solution of 0.6 part of beef tallow in 32 parts of o-dichlorobenzene was added to the mass in step 3 prior to alkalization and steam distillation. The results were essentially the same as those obtained above.

EXAMPLE 2

A series of runs were made as in Example 1, except that the 65 and 650 parts of o-dichlorobenzene therein mentioned were replaced by the following organic liquids in the following quantities, respectively.

(a) Monochlorobenzene, 55 and 550 parts.
(b) Trichlorobenzene, 72 and 720 parts.
(c) p-Chlorotoluene, 65 and 640 parts.
(d) o-Nitrotoluene, 65 and 650 parts.

An improved product (compared to acid pasted material) was obtained in each instance.

EXAMPLE 3

Turbannular steam distillation (a) To a dewatered slurry of 100 pounds of polychloro copper phthalocyanine in 770 pounds of o-dichlorobenzene, prepared by the procedure of Example 1, steps 1 and 2, were added 2 pounds of oleic acid. The resulting slurry was pumped at the rate of 17.5 pounds per hour into one end of a 50-foot tube having an inside diameter of 0.8 inch. Simultaneously, a solution of 6.4 pounds of sodium hydroxide in 27.5 pounds of water was dripped in uniformly (over the entire 50-hour period), at the intake side of the pump. Steam, at a pressure of 26 pounds gauge was introduced into the intake end of the tube at the rate of 310 pounds per hour. During the concurrent passage through the tube, the o-dichlorobenzene was vaporized by the steam. The mixture of vapor, steam and water-wet color passed from the tube into a cyclone separator. From the bottom of this, the aqueous slurry of color was discharged continuously, while the mixture of steam and o-dichlorobenzene vapors was passed into a condenser. The slurry of color was filtered and washed with water until free from alkali.

A portion of the filter cake was flushed into lithographic varnish. It was found to be substantially free from grit, to have good tinctorial strength and to be jetter and yellower than polychloro copper phthalocyanine press cake prepared by the acid-pasting finishing method.

A second portion of the filter cake was dried, pulverized and ground into lithographic varnish on an ink mill. The product had a soft texture, developing its full tinctorial strength without excessive milling. Compared with polychloro copper phthalocyanine powder prepared by acid pasting, it was jetter, yellower, brighter and stronger.

(b) The process of part (a) of this example was modified whereby the slurry of pigment and solvent was pumped into the turbannular still at the rate of 131 pounds per hour and the solution of sodium hydroxide was replaced by a solution of 8.5 pounds of sodium carbonate in 100 pounds of water. The isolated pigment was subjected to the same tests and gave similar results.

(c) When the process of the preceding paragraph was modified by replacing the solution of sodium carbonate with a solution of 6.4 pounds of sodium hydroxide and 2.0 pounds of sodium nitrite in 27.5 pounds of water, similar results were obtained.

EXAMPLE 4

Modified drowning procedure

Step 1.—A molten chlorination mass containing 100 parts of polychloro copper phthalocyanine prepared by the procedure mentioned in Example 1 was drowned into an agitated slurry of 2,500 parts of water, 65 parts of o-dichlorobenzene and 5 parts of a dispersing agent of the octylphenyl-polyglycol ether type. The temperature rose to 80° C. The o-dichlorobenzene was completely adsorbed on the particles of pigment. The slurry was filtered and the cake washed free from acid and water soluble impurities.

Step 2.—The filter cake was added to 650 parts of o-dichlorobenzene and agitated to form a smooth slurry. The slurry was heated to 100°–102° C., until all water boiled off, then the dewatered slurry was raised to 130°–135° C., and held for 1.5 hours.

Step 3.—The slurry was cooled to below 90° C., and 2 parts of polytitanyl stearate (Balthis, U. S. 2,621,194), 2 parts of sodium chromate and 15.8 parts of sodium carbonate were added. The o-dichlorobenzene was then removed by steam distillation. The slurry was filtered and washed with water until free from alkali.

When subjected to tests as in the preceding examples, the product showed similar improvements in quality.

EXAMPLE 5

*Starting with isolated presscake*

Step 1.—100 parts of crude polychloro copper phthalocyanine in the form of a 38% filter cake obtained by drowning a reaction mass consisting of polychloro copper phthalocyanine, aluminum chloride, sodium chloride and cupric chloride into water, then filtering and washing with water, were added to 660 parts of water and agitated to a smooth slurry while warming to 50° C. 61 parts of o-dichlorobenzene were added to the agitated slurry during one-half hour. The agitation was shut off and the solid color particles with adsorbed o-dichlorobenzene were allowed to settle. The clear aqueous layer was decanted and replaced with an equal volume of fresh cold water. Live steam was introduced into the bottom of the vessel to agitate and heat the mixture. Steam was shut off when the temperature reached 65° C.; the color was allowed to settle and the aqueous layer was again decanted. This washing by decantation was repeated twice more. Then the material was washed once by decantation with dilute caustic (3 parts of sodium hydroxide dissolved in 500 parts of water).

Step 2.—610 parts of o-dichlorobenzene were added, the temperature was raised to 100°–102° C., and held at that point until the remaining water was boiled off, together with a portion of the o-dichlorobenzene. The dewatered slurry was heated for 1.5 hours at 125°–132° C., then cooled to below 90° C. and placed in a steam still.

Step 3.—A solution of 8 parts of sodium hydroxide and 2 parts of sodium chromate crystals in 120 parts of water was added, and live steam was blown into the lower part of the vessel until all the o-dichlorobenzene had been distilled out. The aqueous slurry was filtered, washed free from water-soluble material, dried and pulverized. A portion of the powder was ground into alkyd resin enamel. It was found to be yellower, brighter and stronger than acid-pasted polychloro copper phthalocyanine powder.

EXAMPLE 6

Two additional runs were made according to procedure of Example 5, except that the 61 and 610 parts of o-dichlorobenzene therein mentioned were replaced by the following liquids in the following quantities respectively.

(a) Nitrobenzene, 60 and 600 parts.
(b) Xylene, 44 and 440 parts.

The results were essentially the same as in Example 5.

EXAMPLE 7

325 parts of o-dichlorobenzene were added over a period of 15 minutes to an aqueous slurry containing 500 parts of polychloro copper phthalocyanine which slurry was obtained by drowning a eutectic chlorination mass prepared by the process described in step 1 of Example 1. The o-dichlorobenzene was completely adsorbed on the particles of polychloro copper phthalocyanine. The slurry was filtered and the cake was washed with water until free from water soluble chlorides. The color cake was reslurried for 2 hours at 90°–95° C., in 3000 parts of water to which 200 parts of sodium hydroxide had been added as a concentrated aqueous solution. The slurry was filtered and the cake was washed with water until free from alkali and water-soluble chlorides. The filter cake was added to 3,250 parts of o-dichlorobenzene and agitated to form a smooth slurry. This was heated to 100°–102° C., and held until the water originally present in the filter cake was boiled off, along with a fraction of the o-dichlorobenzene. The slurry was then heated to 130°–135° C. for 2 hours, cooled to room temperature, and added to 1,690 parts of o-dichlorobenzene. A concentrated, aqueous solution containing 35.5 parts of sodium nitrite and 35.5 parts of sodium hydroxide was added during the removal of the o-dichlorobenzene by turbannular steam distillation as described in Example 3. The aqueous color slurry was made acidic to litmus paper with concentrated aqueous phosphoric acid and agitated for one-half hour. The slurry was filtered and the filter cake was washed with water until free from acid.

A sample of the filter cake was flushed into lithographic varnish and was found to be yellower, brighter, of equal tinctorial strength and jetter in masstone compared to polychloro copper phthalocyanine press cake prepared by acid-pasting.

A sample of the filter cake was dried, pulverized and when subjected to the same test, gave similar results.

EXAMPLE 8

*Simplified procedure*

227 parts of o-dichlorobenzene were added during 15 minutes with agitation to an aqueous slurry containing 325 parts of polychloro copper phthalocyanine, which slurry was obtained by drowning a eutectic chlorination mass that had been prepared according to the method described in step 1 of Example 1. The o-dichlorobenzene was completely adsorbed on the particles of polychloro copper phthalocyanine. The slurry was filtered and the filter cake was washed with water until free from acid and water-soluble chlorides.

The filter cake thus obtained, when flushed into lithographic varnish gave jet, strong and bright results in the usual ink drawdown tests.

In an alternative procedure, the above filter cake was dried at 100° C. to give a powder which was found to be satisfactory for use in alkyd resin enamels.

According to a second alternative, the above filter cake was added to 1000 parts of water which contained 8 parts of sodium hydroxide and the slurry was agitated for 2 hours at 100° C. The slurry was then filtered and washed with hot water until alkali-free. The alkali-extracted filter cake thus obtained may be flushed into inks, or it may be dried and the powder milled into either inks or paints with excellent results.

As a third alternative the solvent was removed from the above slurry, at the end of the sodium hydroxide treatment as follows: The polychloro copper phthalocyanine was allowed to settle and as much liquid as possible was decanted off and discarded. The slurry was adjusted to a pH of 8 by addition of monosodium phosphate. 2 parts of sperm oil and 6 parts of sodium nitrite were added and the o-dichlorobenzene was removed by steam distillation. The slurry was filtered and the filter cake washed with water until free from alkalinity. A portion of the filter cake was dried, pulverized and ground into lithographic varnish and was found to be yellower, brighter, of equal tinctorial strength and jetter in masstone compared to polychloro copper phthalocyanine prepared by acid-pasting.

When the above example was repeated except for replacing the 227 parts of o-dichlorobenzene by 145 parts of xylene, essentially similar results were obtained.

EXAMPLE 9

200 parts of copper phthalocyanine were chlorinated to a chlorine content of about 46% by heating under pressure with sulfur dichloride in the presence of antimony chloride as the catalyst after the teachings of Fox and Johnson in U. S. 2,377,685. When chlorination was complete, the charge was vented to atmospheric pressure and cooled to about 100° C. Then, 200 parts of anhydrous aluminum chloride were added to the charge and the sulfur chloride was removed by distillation in the presence of a stream of chlorine gas. The dry powder was then slurried in 5600 parts of water and 240 parts of o-dichlorobenzene were added over a period of about 30 minutes while stirring vigorously. The granular slurry was filtered and washed free of chlorides. The granular cake was then introduced into a steam still containing 4800 parts of water in which were dissolved 150 parts of trisodium phosphate ($Na_3PO_4 \cdot 12H_2O$) and 8 parts of sperm oil were added. The o-dichlorobenzene was removed by steam distillation and the resulting alkaline slurry was filtered hot, washed free of alkali, dried at 60° C. and pulverized to give a polychloro copper phthalocyanine having excellent pigmentary qualities.

EXAMPLE 10

*Product from modified $SCl_2$ process*

(a) Into a Monel metal autoclave equipped with an efficient agitator and capable of withstanding pressures in the order of 40–50 atmospheres, there were charged 327 parts of copper phthalocyanine together with 33 parts of anhydrous cupric chloride, 327 parts of anhydrous aluminum chloride and 4900 parts of sulfur dichloride containing 68–69% chlorine. After closing the autoclave it was slowly heated, as in an oil bath, to a final temperature of about 180° C. During this heating cycle the pressure increased because of the vapor pressure of the sulfur dichloride and because of the HCl released during chlorination of the phthalocyanine molecule. When the pressure reached 265 p. s. i. g. (pounds per square inch gauge) it was then vented and kept at 265 p. s. i. g. throughout the cycle which extended for about 4 hours after the temperature reached 180° C. The temperature was maintained at 180°–185° C.

At the end of the 4-hour heating cycle, the pressure in the autoclave was reduced to atmospheric pressure by venting through a recovery system for the sulfur chloride and heating was continued while a stream of chlorine gas was passed through to assist in the removal and recovery of the sulfur dichloride. A dry product was obtained which required further treatment before use as a pigment.

When the aluminum chloride in part (a) of this example was replaced by 327 parts of anhydrous ferric chloride the results obtained were essentially the same.

(b) 182 parts of the crude pigment obtained above (containing 122 parts of water-extracted solids) were slurried in 2000 parts of water with good agitation and the stirring was continued for about 15 minutes until a smooth slurry resulted. Then 79 parts of o-dichlorobenzene were added dropwise while continuing the vigorous agitation to give granular pigment particles which were filtered from the water and washed until free of chlorides. The granular cake was then charged to a steam still containing 2000 parts of water in which 50 parts of disodium phosphate ($Na_2HPO_4 \cdot 12H_2O$) were dissolved. 2.4 parts of sperm oil were added and the o-dichlorobenzene removed by steam distillation. The resulting alkaline slurry was filtered hot, washed free of alkali, dried at 60° C. and pulverized to give a high strength polychloro copper phthalocyanine which required no further treatment for use as a green pigment. Furthermore, this pigment was markedly more yellow in hue than a portion of the same crude pigment which had been extracted in the heretofore known manner and conditioned for pigment use either by acid pasting or by the milling methods of Lane and Stratton (U. S. 2,556,727) or of Graham (U. S. 2,556,728 and 2,556,730).

EXAMPLE 11

182 parts of the crude pigment of Example 10(a) were slurried with water, treated with 79 parts of o-dichlorobenzene, filtered and washed as in Example 10(b) above. The granular cake was then charged to a steam still containing 2000 parts of water and while vigorously stirring, 25 parts of o-dichlorobenzene were added. 50 parts of disodium phosphate ($Na_2HPO_4 \cdot 12H_2O$) and 2.4 parts of sperm oil were then added, the o-dichlorobenzene removed by steam distillation and the aqueous slurry filtered, washed and dried as in Example 10(b). The resulting product after pulverization is a bright green pigment which exhibits excellent color strength and a yellower hue than the pigment of Example 10(b). Both of these products exhibit jet masstone in printing ink and a highly desirable two-tone effect when combined with flake aluminum in the pigmentation of automotive lacquers or enamels.

EXAMPLE 12

The process of Example 11 was repeated except that the amount of o-dichlorobenzene added to the steam still prior to distillation was increased to 1140 parts to give a two phase liquid system containing pigment suspended in 10 times its weight of o-dichlorobenzene.

After removal of the o-dichlorobenzene by steam distillation and isolation of the pigment as described in Example 10(b) above, a green pigment having very excellent strength and yellowness of hue was obtained.

EXAMPLE 13

*Caustic treatment before granulation*

182 parts of the crude pigment of Example 10(a) (about 122 parts of water extracted solids) were slurried in about 2000 parts of water with good agitation until a smooth slurry was obtained. This slurry was heated to the boil, stirred for 1 hour at the boil then filtered and washed free of soluble salts. The filter cake was then added to a solution of 10 parts NaOH in 2000 parts of water. This slurry was treated with 122 parts of o-dichlorobenzene and 4 parts stearic acid, and the mixture was subjected to steam distillation until all of the o-dichlorobenzene was removed. The slurry was finally filtered, washed alkali free and dried to give a strong, bright, green pigment of yellow hue. This pigment was excellently adapted for ease of dispersion in the vehicles normally used in the trade.

We claim as our invention:

1. A process of recovering pigmentary polychloro copper phthalocyanine from an anhydrous reaction mass containing non-pigmentary polychloro copper phthalocyanine in admixture with a metal halide of the group consisting of aluminum chloride, aluminum bromide and ferric chloride, the proportion of metal halide to pigment being not less than 2:1 in moles, which comprises contacting said reaction mass with water and with an inert, water-immiscible, organic diluent which is capable of displacing water from the surface of a solid phthalocyanine pigment particle, the proportion of said organic liquid to pigment being not less than 0.3:1 by weight, whereby to form an aqueous solution of said metal halide, and separating the pigment from said aqueous solution.

2. A process as in claim 1, wherein said anhydrous admixture is the crude reaction mass obtained by chlorinating copper phthalocyanine in a melt of sodium chloride and aluminum chloride.

3. A process as in claim 2 wherein said anhydrous reaction mass is contacted directly with a mixture of water and said organic liquid.

4. A process as in claim 2 wherein the said crude reaction mass is first drowned in water, then filtered off and entered into a mixture of water and said organic liquid.

5. A process as in claim 1, wherein the aqueous pigment paste obtained at the end of the process defined in said claim is treated further to remove the organic liquid.

6. A process as in claim 1, wherein the aqueous pigment paste obtained at the end of the process defined in said claim is subjected to steam distillation to remove the organic liquid.

7. A process as in claim 6, wherein the aqueous pigment paste resulting from the steam distillation is dried to produce a pigment powder.

8. A process as in claim 1, wherein the aqueous pigment paste obtained at the end of the process defined in said claim is first diluted with an added quantity of organic liquid, sufficient to produce a continuous phase thereof, whereupon the mass is heated to drive off its water content.

9. The process of recovering polychloro copper phthalocyanine from the reaction mass obtained in the aluminum chloride-sodium chloride fusion process of chlorinating copper phthalocyanine, which comprises in combination a sequence of the following steps: (1) effecting separation of the pigment from inorganic salts by the aid of an aqueous drowning bath containing a water-immiscible organic liquid in quantity not less than 40% and not exceeding 110% by weight based on the weight of pigment in the reaction mass, (2) transferring the water-wet pigment into a continuous organic liquid phase which is immiscible with water, accompanied by complete elimination of the residual water, and (3) removing the organic liquid phase from the system formed in step 2 and replacing the same by a continuous aqueous phase, to produce an aqueous paste of the pigment.

10. A process as in claim 9, wherein the organic liquid employed in step 1 is a benzenoid compound selected from the group consisting of the benzenoid hydrocarbons and their nuclear halogen and nitro derivatives.

11. A process as in claim 9, wherein step 2 is achieved by stirring the water-wet pigment obtained in step 1 in a water-immiscible organic liquid boiling above 100° C., said liquid being employed in quantity from 5.5 to 9 parts by weight based on the dry weight of pigment, and maintaining the mass at a temperature above 100° C., whereby to effect complete dewatering of the mass.

12. A process as in claim 9, wherein step 3 is achieved by steam distillation in the presence of alkali.

13. A process as in claim 9, wherein step 3 is achieved by steam distillation in the presence of alkali and in the further presence of a fatty substance selected from the group consisting of fats, soaps, long-chain fatty acids, long-chain aliphatic alcohols, esters of such fatty acids and esters of such alcohols.

14. A process as in claim 9, wherein step 3 is achieved by steam distillation in the presence of alkali and in the further presence of an oxidizing agent selected from the group consisting of sodium chromate and sodium nitrite.

15. As a new composition of matter, a tinctorially strong, crystalline, polychloro copper phthalocyanine containing at least 46% chlorine and being further characterized by consisting predominantly of parallelepiped shaped particles of 0.05 to 0.2 micron length, said length being 2 to 3 times the width and 5 to 10 times the thickness, and by exhibiting a bright, yellow-green hue when tested in lithographic ink drawdowns, said composition of matter being the product resulting from the process defined in claim 1.

References Cited in the file of this patent

UNITED STATES PATENTS

| | | |
|---|---|---|
| 2,138,049 | Vesce | Nov. 29, 1938 |
| 2,282,006 | Sloan | May 5, 1942 |
| 2,291,452 | Dahlen et al. | July 28, 1942 |
| 2,305,379 | Detrick et al. | Dec. 15, 1942 |
| 2,359,737 | Lacey et al. | Oct. 10, 1944 |
| 2,549,842 | Moser | Apr. 24, 1951 |
| 2,615,027 | Bluemmel et al. | Oct. 21, 1952 |
| 2,618,642 | Keller et al. | Nov. 18, 1952 |
| 2,645,643 | Gottlieb | July 14, 1953 |